Oct. 7, 1958     C. D. DUNBAR     2,855,175
GATE VALVE

Filed June 19, 1953     4 Sheets-Sheet 1

Calvin D. Dunbar
INVENTOR.

BY Charles E. Lightfoot
ATTORNEY

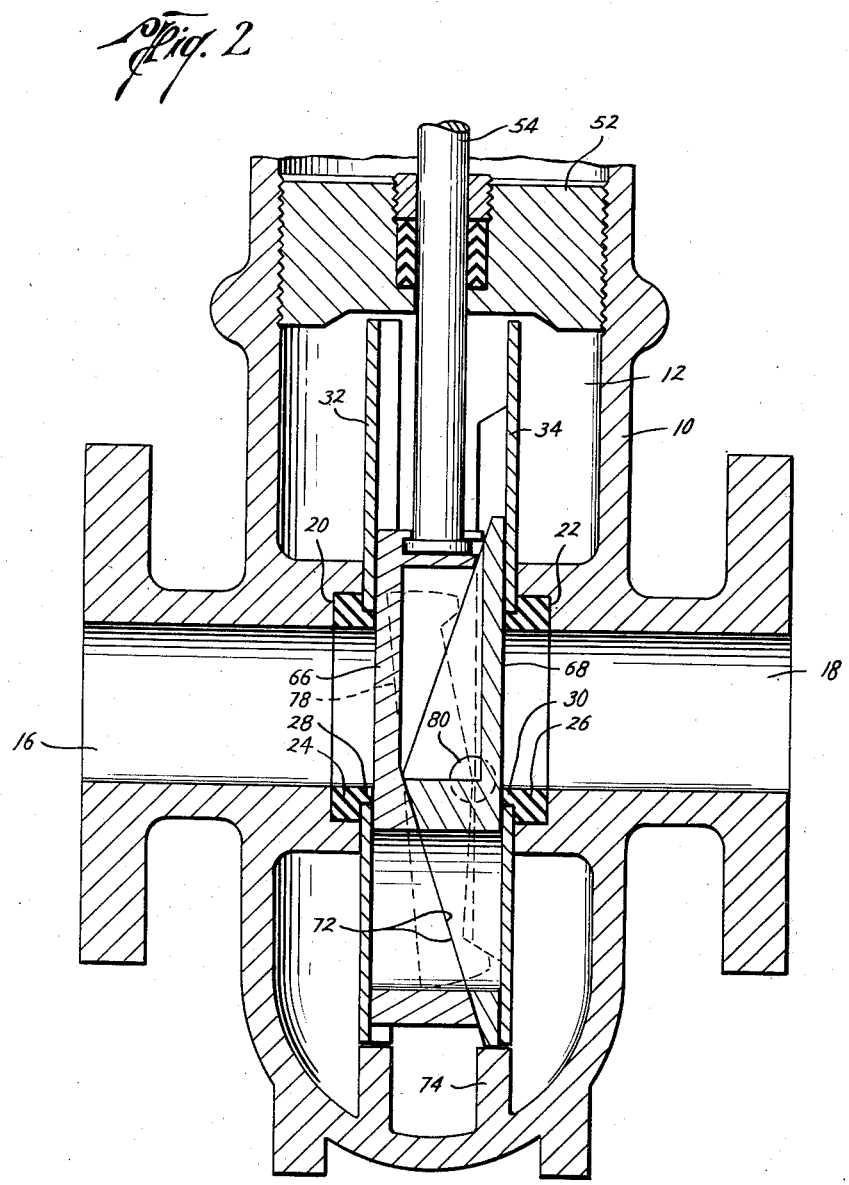

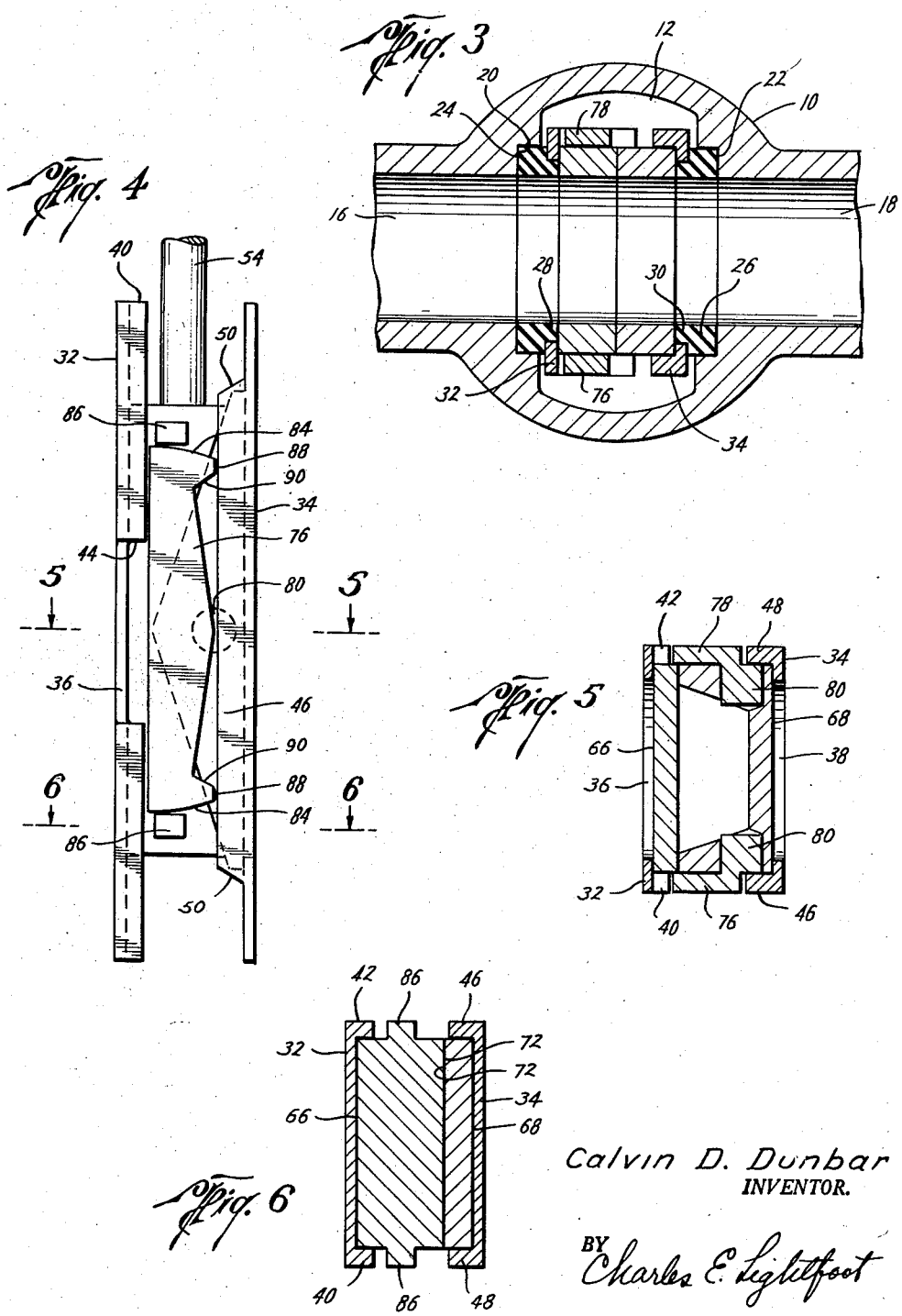

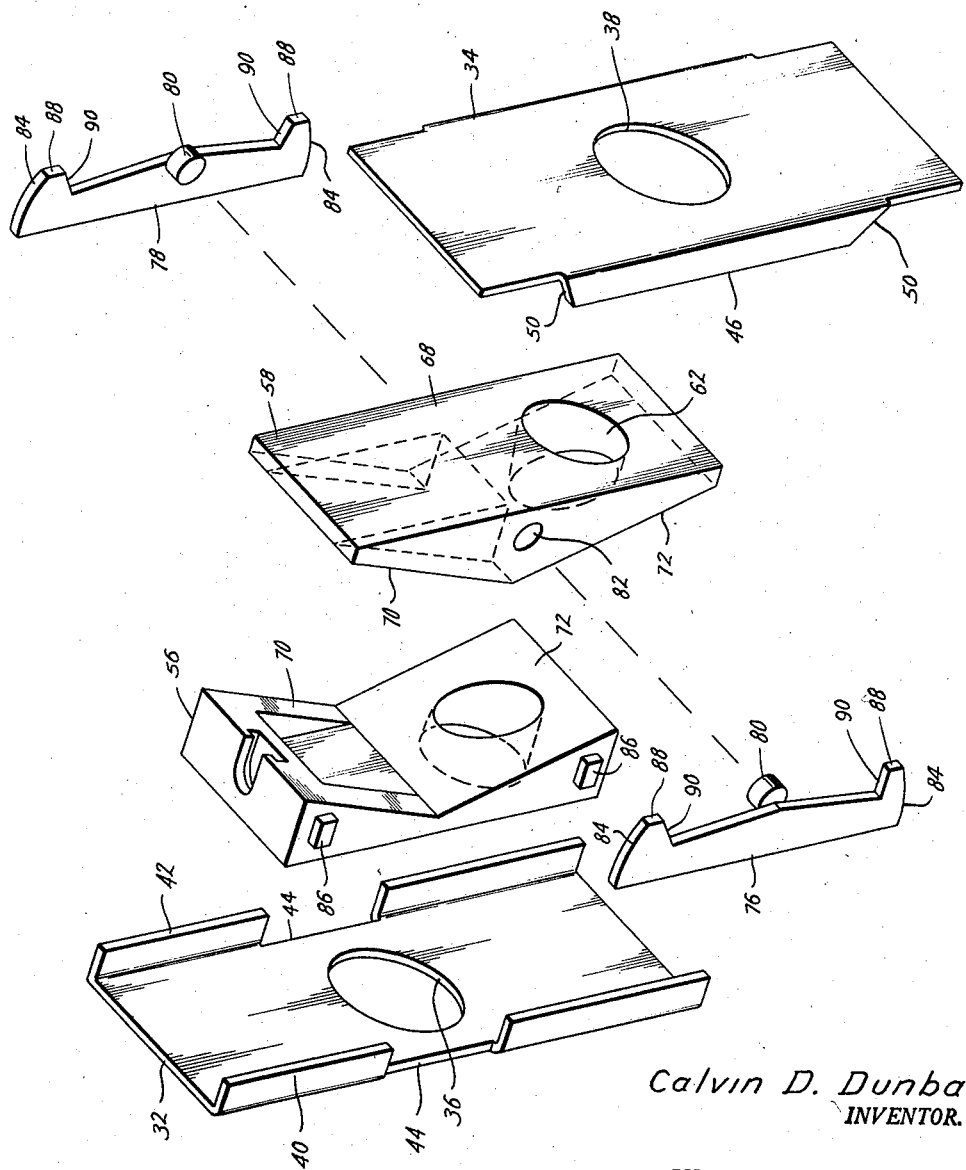

United States Patent Office 2,855,175
Patented Oct. 7, 1958

2,855,175

GATE VALVE

Calvin D. Dunbar, Houston, Tex.

Application June 19, 1953, Serial No. 362,764

4 Claims. (Cl. 251—196)

This invention relates to a gate valve and more particularly to a rising stem gate valve of the type having an expansible, sectional double-wedging valve gate assembly.

The gate assembly of valves of this type is formed in two sections provided with complementary opposed inner faces, each formed with two angularly related surface portions diverging transversely of the assembly, in the direction of flow through the valve, to form two sets of wedging surfaces.

Either set of these wedging surfaces is effective, upon appropriate relative displacement between the two sections, from a centered relative position corresponding to the minimum overall transverse dimension of the assembly (i. e. wherein the apexes of the inner diverging faces are aligned), to expand the gate assembly normally against the valve seats. One set of wedging surfaces is employed, by causing the relative displacement between the two gate sections in one direction, to expand the gate assembly as it moves into valve closing position and so provide a tight seal between the gate assembly and the valve seats, and between the two gate sections. The other set of wedging surfaces is employed, by causing relative displacement between the two gate sections in the opposite direction, to similarly tightly seal the valve, as the assembly moves into open position. The two gate sections are moved together as a unit between open and closed positions of the valve by a conventional valve stem connected to one of the sections. Stops are provided for the other, or floating, gate section at both ends of travel of the assembly, so that continued movement of the stem-connected section toward the end of travel of the assembly causes the aforesaid relative displacement between the two sections in order to seal the valve in both its open and closed positions.

Initial operation of the valve stem, to move the gate assembly out of sealed open or sealed closed position, moves the stem-connected section while the floating section remains stationary. This initial relative displacement between the two sections, in a direction back toward their centered relative position, immediately relieves the expansive forces on the assembly created by one set of wedging surfaces, i. e. that set which sealed the assembly in the position (either open or closed) out of which it is being moved. Continued operation of the valve stem first completely centers the two sections and, if preventive means are not employed, is then apt to move the stem-connected section past centered position, relative to the floating section, substantially to the other extreme of possible relative displacement between the two sections. With the two sections in this latter relative position, the wedging surfaces of the said one set are parted and the wedging surfaces of the other set are in contact. Thereafter, continued movement of the stem-connected section produces one of two results. If the frictional forces which retard movement of the floating section are, or at any point along the travel of the assembly become high enough, sufficient additional relative displacement takes place between the two elements to cause the other set of wedging surfaces to forcibly expand the assembly against the valve seats and so bind it therebetween that further movement of the assembly toward the other end of its travel is extremely difficult, if not impossible. If the aforesaid retarding forces are not sufficiently high, the contact between the other set of wedging surfaces merely serves to drag the floating section along with the stem-connected section, and the assembly moves to the other end of its travel.

It is an important object of the present invention to provide a gate valve structure of the type referred to above having means for preventing expansive wedging action between the gate sections during the movement of the sections between the open and closed positions of the valve.

Another object of the invention is to provide a gate valve assembly having gate sections of the double-wedged type and including cam means carried by one of the gate sections and means cooperable with the gate sections and cam means to prevent expansive wedging action between the gate sections during the opening and closing movements of the valve.

A further object of the invention is to provide a gate valve assembly having gate sections of the double-wedged type, and including cam means operable during movement of the valve between open and closed positions to hold the sections against relative displacement and which is also operable when the valve approaches open or closed position to release the sections to permit such relative displacement.

A still further object of the invention is the provision of a gate valve assembly having gate sections of the double-wedged type, and including means for preventing wedging relative displacement between the gate sections during movement of the valve between open and closed positions and for permitting such displacement when the gate reaches either of those positions, without forming a positive connection between the sections.

The above and other important objects and advantages of the invention will best be understood from the following detailed description, constituting a specification of the same, when considered in conjunction with the annexed drawings wherein—

Figure 2 is a vertical, central, cross-sectional view of the invention, showing the valve in closed position;

Figure 3 is a cross-sectional view taken along line 3—3 of Figure 1, looking in the direction indicated by the arrows;

Figure 4 is a side elevational view of the gate assembly of the invention, removed from the valve casing, showing the relationship of the parts with the valve in an intermediate position between the open and closed positions of the valve;

Figure 5 is an enlarged cross-sectional view taken along the line 5—5 of Figure 4, looking in the direction indicated by the arrows;

Figure 6 is an enlarged cross-sectional view taken along the line 6—6 of Figure 4, looking in the direction indicated by the arrows; and Figure 7 is an exploded perspective view of the two gate sections together with the seat skirts and locking cams.

Figure 1:
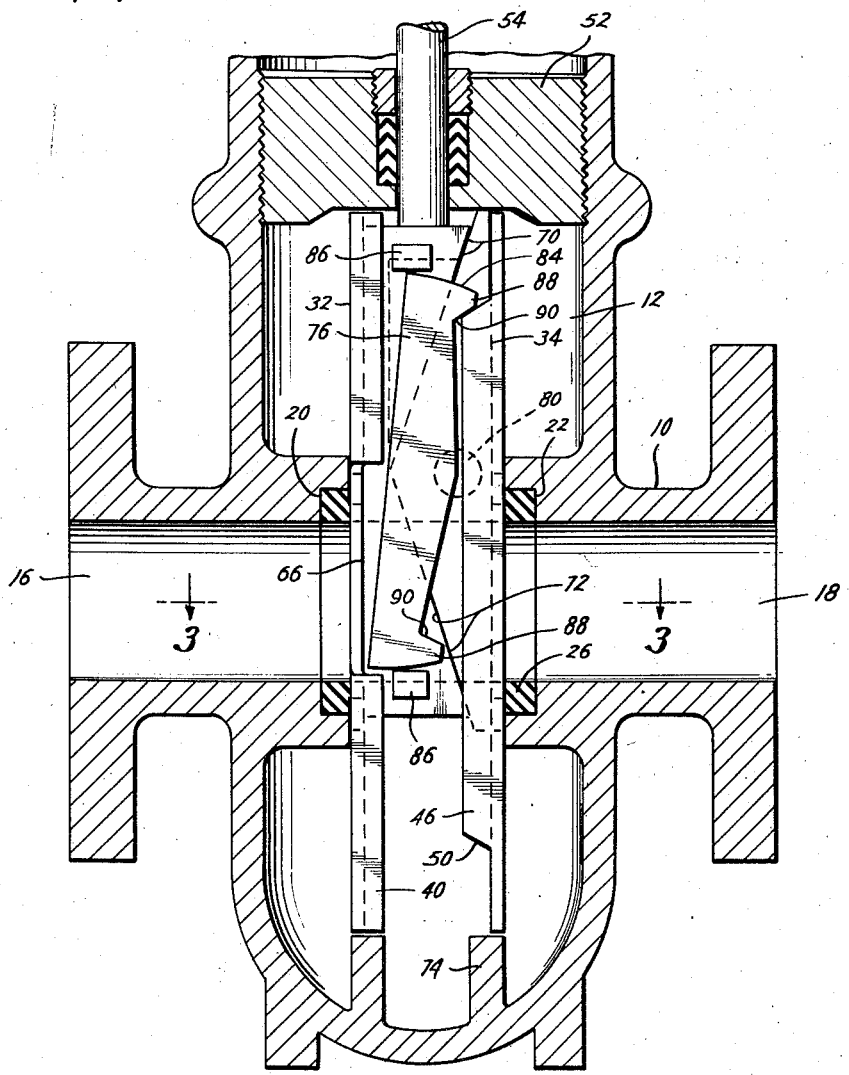
Figure 1 is a side elevational view, partly in cross-section of a rising-stem gate valve having a double-wedging expansible gate assembly constructed in accordance with the invention, showing the same in open position.

Referring now to the drawings in greater detail, the invention is illustrated in its application to a gate valve of the rising-stem type having a valve casing 10, provided with an interior valve chamber 12 in which the gate mechanism of the valve is movably disposed. The valve casing has aligned parts 16 and 18 which are surrounded at their inner ends by enlarged counterbores 20 and 22, respectively, providing recesses for valve seat members 24 and 26 which extend into the chamber 12, and are provided therein with reduced end portions 28 and 30.

Seat plates or skirts 32 and 34 are positioned on the valve seat members 24 and 26, each of these skirts having an opening, as indicated at 36 and 38, respectively, into which the reduced inner end portions 28 and 30, of the respective seat members extend. The seat skirts serve to extend the areas of the valve seats, and may be formed separately from the seat members 24 and 26, or may be constructed integrally therewith if desired. The seat skirt 32 is provided with side flanges 40 and 42, which may extend substantially throughout the length of the skirt, and are cut away at their mid portion, as indicated at 44, 44 for a purpose later to be made apparent. The seat skirt 34 is also provided with side flanges 46 and 48, which flanges terminate short of the opposite ends of the skirt, and are formed with sloping end surfaces 50, 50, also for a purpose later to be made apparent. The side flanges of the seat skirts serve to confine and guide the valve gate assembly for substantially rectilinear movement in opening and closing the valve.

The upper portion of the housing is of conventional construction having a bonnet 52, through which a valve stem 54 extends.

The ported valve gate assembly is slideably disposed between the seat skirts 32 and 34 for rectilinear movement between the seat members 24 and 26 is formed in two sections 56, and 58, respectively, the section 56 being known as the gate, while the section 58 is called the segment. The sections are provided with ports 60 and 62, respectively, which in the open position of the valve are aligned with the ports 16 and 18, as best seen in Figure 1 of the drawings. The lower or inner end of the valve stem 54 is detachably connected to the upper end of the gate section 56 by a T head and slot connection, as clearly seen in Figure 2 of the drawings, so that movement of the gate assembly to open or close the valve may be readily accomplished by axial movement of the stem.

The sections 56 and 58 are provided with flat outer faces 66 and 68, respectively, disposed parallel to the respective inner faces of the valve seats, for sealing engagement therewith.

The inner opposed faces of the two sections are formed with two complementary, angularly related surface portions that diverge from the mid-portions of the sections to provide two sets of wedging surfaces 70 and 72, as best seen in Figure 7 of the drawing. The sections are of such size that when either of the two sets of wedging surfaces are in contact, the overall transverse dimension of the gate assembly, normal to the valve seat, whereby relative displacement of the sections in directions parallel to the movement of the gate assembly may take place to a limited extent. The segment section 58 of the assembly is engageable at its lower end with an internal stop 74, within the valve chamber, to limit downward movement of the segment, whereupon further downward movement of the gate section 56 causes engagement of the surfaces 70, whereby the gate assembly is forceably expanded and the valve sealed in closed position. Similarly, upon upward movement of the sections the upper end of the segment 58 engages the lower surface of the bonnet 52, to limit further upward movement of the segment so that further upward movement of the gate section 56 causes the surfaces 72 to be brought into engagement to expand the valves into sealing engagement with the valve seat in the open position of the valve.

Upon initial movement of the sections from either valve closed or valve open position the gate section 56 only is moved, while the segment 58 remains stationary, so that relative displacement takes places between the sections, which immediately relieves the expansive force of the wedging surfaces, and thereafter the sections may move together toward the other position of the valve.

When the valve is moved in either direction the segment section 58 may fail to move freely, resulting in premature expansion of the sections, so that the valve may be opened or closed only with difficulty, if at all, and means must therefore be provided to prevent relative displacement between the sections, until the segment 58 has reached the limit of its travel. For this purpose cam members 76 and 78 are provided each of which is formed with a lug 82, mediate its opposite ends. The segment 58 is provided with suitable openings 82, 82 in its opposite sides, mediate the ends of the segment, for the reception of the lugs 80 of the cam, whereby the cams are pivotally supported on the segments, and extend in overlapping relation to the opposite sides of the gate section 56. Each of the cam members 76 and 78 is formed at its opposite ends with the curved end faces 84, positioned for engagement with the opposed surfaces of a pair of spaced lugs 86, 86, on each side of the gate section 56, whereby the cams may rotate on the lugs 80, and will be at all times in position to engage the lugs 86 of the gate section.

The cam members 76 are also cut away to form tooth like projections 88, providing camming surfaces 90, which are positioned to slideably engage the sloping surfaces 50 of the flanges 46 and 48 of the seat skirt 34, when the tooth-like projections 88 of the cam members reach positions in which the cam members may rotate on the lugs 80.

There will necessarily be a certain amount of clearance provided between the lugs 86 of the sections 56 and the end faces 84 of the cams 76 and also between the surfaces 70 and 72 of the sections, so that when the gate is in open position, as seen in Figure 1, the surfaces 72 of the sections will be in wedging contact while the surfaces 70 are out of wedging engagement and when the gate is closed, as seen in Figure 2, the surfaces 70 will be in wedging contact while the surfaces 72 are out of wedging engagement.

In the operation of the valve, assuming that the valve is in open position, as illustrated in Figure 1, the surfaces 72 of the sections 56 and 58 will be in contact, and the upper end of the segment section 58 will be in engagement with the bonnet 52, so that the sections are in expanded condition in sealing engagement with the valve seat, and the cams 76 and 78 will be in the position illustrated in Figure 1, wherein the upper camming surfaces 90 of the cams will be in contact with the upper sloping surfaces 50 of the flanges of the seat skirt 34. Upon initial downward movement of the valve stem 54 the surfaces 72 of the sections 56 and 58 will be moved out of engagement by downward displacement of the gate section 56 relative to the segment section 58 due to the provision of the slight clearance between the faces 70 and 72 of the gate sections, thus permitting the sections to move towards each other to free the sections from the valve seats. The sections 56 and 58 then move downwardly together and the upper end faces 90 of the cams will ride upon the upper sloping surfaces 50 of the flanges of the seat skirt to cause the cams to rotate on the lugs 80 to withdraw the upper projections 84 away from the upper sloping surfaces 50 of the flanges of the seat skirt 34, whereby the cams will be moved to the position indicated in Figure 4, so that the sections will then move downwardly together in unwedged condition toward the closed position of the valve.

During such downward movement of the section, it will be seen that the cams are positioned between the flanges 40 and 42 of the seat skirt 32 and the flanges 46 and 48 of the seat skirt 38, so that the cams cannot rotate on the lugs 80, and the sections will be held against wedging engagement to prevent relative displacement of the sections, whereby the sections are prevented from being expanded against the valve seats. When the sections have moved downwardly to a position in which the lower end of the segment section engages the stop 74, however, the segments will be held against further downward movement in the valve chamber, at which time the lower projections 88 of the cams will be in position to permit rotation of the cams in a direction to move the lower camming surfaces 90 into contact with the lower sloping surfaces of the flanges 46 and 48 of the seat skirt 34, whereupon the faces 70 of the sections will be moved into engagement by further downward movement of the gate section 56, to expand the sections into sealing engagement with the valve seats. As best seen in Figure 1, the end portions of the cams may move into the cut away portions of the flanges 40 and 42 of the seat skirts 32, when the valve is in closed or open position, whereby the cams are freely rotatable in those positions to permit relative displacement between the sections, whereby the sections may move to expanded positions.

It will be apparent that by constructing the valve assembly as described above, the valve seats and seat skirts may be readily placed in position with the bonnet 52 removed, and the gate sections and cam may be readily assembled on the stem in the relative positions illustrated in Figure 4, and inserted between the seat skirts. In this manner it will be seen that the parts are easily assembled and disassembled, and may be readily removed and replaced for purposes of maintenance and repair.

The invention thus provides a gate valve structure which is of simple design and rugged construction, and in which the wear on the parts due to repeated opening and closing movements of the valve is greatly reduced, while at the same time an effective seal is maintained between the valve and the valve seat in the open and closed positions of the valve.

While the invention has been disclosed herein connection with a certain specific embodiment of the same, it will be understood that this is intended by way of illustration only, and that numerous changes can be made in the construction and arrangement of the various parts without departing from the spirit of the invention or the scope of the appended claims.

Having thus clearly shown and described the invention, what is claimed as new and desired to secure by Letters Patent is:

1. A gate valve of the through conduit type comprising: a housing forming a valve chamber having aligned ports provided with opposed parallel valve seats; a seat skirt surrounding one of said seats and having upper and lower oppositely inclined end surfaces; an expansible ported valve gate assembly mounted for rectilinear movement between said seats to open and close the valve, said assembly comprising two ported abutting members having parallel outer sealing faces to engage the valve seats and complementary opposed inner faces each formed with at least one surface portion that is inclined with respect to said seats to form at least one set of wedging surfaces effective to expand said assembly normally of said seats and force said members oppositely into sealing engagement therewith upon relative displacement between said members in one direction parallel to the movement of said assembly; means for moving said assembly to valve-open and valve closed positions; stop means for one of said members for effecting wedging relative displacement therebetween adjacent at least one end of travel of said assembly in order to seal the valve; cam means carried by one of said members for movement into and out of a locking position in engagement with the members to prevent wedging relative displacement between the members during movement of the members between said valve-open and valve-closed positions, means on the other of said members positioned to engage said cam means to cause said members to move together said cam means having longitudinally spaced oppositely inclined faces positioned for coaction with said inclined surfaces of said skirt to move said cam means into said locking position upon movement of said members away from said valve-open and said valve-closed positions.

2. A gate valve of the through conduit type comprising: a housing forming a valve chamber having aligned ports provided with opposed parallel valve seats; a seat skirt surrounding one of said seats and having upper and lower oppositely inclined end surfaces; an expansible ported valve gate assembly mounted for rectilinear movement between said seats to open and close the valve, said assembly comprising two ported abutting members having parallel outer sealing faces to engage the valve seats and complementary opposed inner faces each formed with at least one surface portion that is inclined with respect to said seats to form at least one set of wedging surfaces effective to expand said assembly normally of said seats and force said members oppositely into sealing engagement therewith upon relative displacement between said members in one direction parallel to the movement of said assembly; means for moving said assembly to valve-open and valve closed positions; stop means for one of said members for effecting wedging relative displacement therebetween adjacent at least one end of travel of said assembly in order to seal the valve; an elongated cam pivotally mounted mediate its ends on one of said members for movement into and out of a locking position in engagement with the members to prevent wedging relative displacement between the members during movement of the members between said valve-open and valve-closed positions, said cam means being engageable with said seat skirt to hold said cam means in said locking position during movement of said members between said valve-open and said valve-closed positions, said cam means having longitudinally spaced oppositely inclined faces positioned for coaction with said inclined surfaces of said skirt to move said cam means into said locking position upon movement of said members away from said valve-open and said valve-closed positions and means on the other of said members positioned for engagement with an end of said cam means upon engagement of said one of said members with said stop means to move said cam means out of said locking position.

3. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner faces each formed with at least one surface portion that is inclined with respect to said seats to form at least one set of wedging surfaces effective to expand said assembly normally of said seats and force said members oppositely into sealing engagement therewith upon relative displacement between said members in one direction parallel to the movement of said assembly; means for moving said assembly to valve-open and valve-closed positions; stop means for one of said members for effecting wedging relative displacement therebetween adjacent at least one end of travel of said assembly in order to seal the valve; an elongated cam movable with said members and pivotally engageable at a point mediate its ends with one of said members for movement into and out of a locking position in engagement with the members to prevent wedging relative displacement between the members, said cam having upper and lower oppositely inclined faces, stationary means in the housing having inclined surfaces positioned for coaction with said inclined faces to move said cam into said locking position upon movement of said members away from said valve-open and said valve-closed positions and means on the other of said members positioned to engage an end of said cam at a point laterally offset from the point of pivotal engagement of the cam with said one of said members upon engagement of said one of said members with said stop means to cause said cam to move out of said locking position.

4. A gate valve of the through conduit type comprising: a housing forming a valve chamber having aligned ports provided with opposed parallel valve seats; an expansible ported valve gate assembly mounted for rectilinear movement between said seats to open and close the valve, said assembly comprising two ported abutting members having parallel outer sealing faces to engage the valve seats and complementary opposed inner faces each formed with at least one surface portion that is inclined with respect to said seats to form at least one set of wedging surfaces effective to expand said assembly normally of said seats and force said members oppositely into sealing engagement therewith upon relative displacement between said members in one direction parallel to the movement of said assembly; means for moving said assembly to valve-open and valve-closed positions; stop means for one of said members for effecting wedging relative displacement therebetween adjacent at least one end of travel of said assembly in order to seal the valve; an elongated cam pivotally mounted mediate its ends on one of said members for movment into and out of a locking position in engagement with the members to prevent wedging relative displacement between the members, said cam having upper and lower oppositely inclined faces, stationary means in the housing having inclined surfaces positioned for coaction with said inclined faces to move said cam into said locking position upon movement of said members away from said valve-open and said valve-closed positions, means on the other of said members positioned to engage an end of said cam to cause said members to move together when said cam is in said locking position said members being engageable with said cam means at laterally offset points upon engagement of said one of said members with said stop means to cause said cam means to move out of said locking position.

References Cited in the file of this patent

UNITED STATES PATENTS

| | | |
|---|---|---|
| 2,482,409 | Fowler | Sept. 20, 1949 |
| 2,583,512 | Laurent | Jan. 22, 1952 |